United States Patent
Liu et al.

(10) Patent No.: US 11,294,773 B2
(45) Date of Patent: Apr. 5, 2022

(54) METHOD, APPARATUS AND COMPUTER PROGRAM PRODUCT FOR MANAGING BACKUP SYSTEM

(71) Applicant: EMC IP Holding Company LLC, Hopkinton, MA (US)

(72) Inventors: Qin Liu, Chengdu (CN); Yi Jiang, Chengdu (CN); Wei Chen, Chengdu (CN); Jianxu Xu, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 53 days.

(21) Appl. No.: 16/792,829

(22) Filed: Feb. 17, 2020

(65) Prior Publication Data
US 2021/0117279 A1 Apr. 22, 2021

(30) Foreign Application Priority Data
Oct. 17, 2019 (CN) .......................... 201910986471.7

(51) Int. Cl.
*G06F 11/14* (2006.01)
*G06N 3/02* (2006.01)
(52) U.S. Cl.
CPC ...... *G06F 11/1461* (2013.01); *G06F 11/1464* (2013.01); *G06N 3/02* (2013.01)
(58) Field of Classification Search
None
See application file for complete search history.

(56) References Cited

U.S. PATENT DOCUMENTS

| | | | |
|---|---|---|---|
| 8,429,096 B1* | 4/2013 | Soundararajan | G06F 16/217 706/12 |
| 8,429,097 B1* | 4/2013 | Sivasubramanian | G06F 16/2282 706/12 |
| 10,089,144 B1* | 10/2018 | Nagpal | G06F 9/5027 |
| 2017/0024643 A1* | 1/2017 | Lillicrap | G06N 3/006 |
| 2017/0262346 A1* | 9/2017 | Pradhan | G06F 11/2074 |
| 2018/0271015 A1* | 9/2018 | Redden | A01D 41/127 |
| 2019/0129798 A1* | 5/2019 | Mutha | G06F 11/3034 |
| 2020/0104214 A1* | 4/2020 | Ahn | G06F 11/1461 |

* cited by examiner

*Primary Examiner* — Aleksandr Kerzhner
*Assistant Examiner* — Eddy Cheung
(74) *Attorney, Agent, or Firm* — Womble Bond Dickinson (US) LLP

(57) ABSTRACT

Embodiments of the present disclosure provide a method, device, and computer program product for managing a backup system. The method comprises obtaining a state of a backup system, the backup system comprising a backup server and at least one backup client, the backup server being communicatively coupled to the at least one backup client via a network and configured to back up data of the at least one backup client; determining a reward score corresponding to the state of the backup system; and determining, based on the state of the backup system and the reward score, configuration information for the backup system, the configuration information indicating a schedule for the backup server to perform data backups on the at least one backup client. Embodiments of the present disclosure can improve the performance of the backup system and reduce the management overhead of the backup system.

20 Claims, 6 Drawing Sheets

METHOD, APPARATUS AND COMPUTER PROGRAM PRODUCT FOR MANAGING BACKUP SYSTEM

CROSS-REFERENCE TO RELATED APPLICATION

This patent application claims priority, under 35 U.S.C. § 119, of Chinese Patent Application No. 201910986471.7, filed Oct. 17, 2019, which is incorporated by reference herein in its entirety.

FIELD

Embodiments of the present disclosure generally relate to the field of data storage, and more specifically, to a method, device and computer program product for managing a backup system.

BACKGROUND

To avoid data loss, a backup system is often used for storing data. The backup system typically includes a backup server and a backup client, where the backup client is connected to the backup server via a network, and the backup server is used to back up data at the backup client.

In order to ensure that data at the backup client is not lost, the data at the backup client needs to be backed up to the storage server periodically. However, there are a lot of backup clients in a large-scale backup system. If data backups for each backup client are scheduled independently, it will be very difficult to manage backup time slots for all of the backup clients. Therefore, the backup schedules for all of the backup clients need to be managed collectively to achieve optimal system performance.

SUMMARY

Embodiments of the present disclosure provide a method, device and computer program product for managing a backup system.

In a first aspect of the present disclosure, there is provided a method of managing a backup system. The method comprises obtaining a state of a backup system, the backup system comprising a backup server and at least one backup client, the backup server being communicatively coupled to the at least one backup client via a network and configured to back up data of the at least one backup client; determining a reward score corresponding to the state of the backup system; and determining, based on the state of the backup system and the reward score, configuration information for the backup system, the configuration information indicating a schedule for the backup server to perform data backups on the at least one backup client.

In a second aspect of the present disclosure, there is provided an electronic device. The electronic device comprises at least one processing unit and at least one memory. The at least one memory is coupled to the at least one processing unit and stores instructions for execution by the at least one processing unit. The instructions, when executed by the at least one processing unit, cause the device to perform acts comprising: obtaining a state of a backup system, the backup system comprising a backup server and at least one backup client, the backup server being communicatively coupled to the at least one backup client via a network and configured to back up data of the at least one backup client; determining a reward score corresponding to the state of the backup system; and determining, based on the state of the backup system and the reward score, configuration information for the backup system, the configuration information indicating a schedule for the backup server to perform data backups on the at least one backup client.

In a third aspect of the present disclosure, there is provided a computer program product. The computer program product is tangibly stored on a non-transitory computer storage medium and includes machine-executable instructions. The machine-executable instructions, when executed by a device, cause the device to execute the method according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features, and advantages of example embodiments of the present disclosure will become more apparent from the following detailed description with reference to the accompanying drawings, in which the same reference symbols refer to the same elements.

Throughout the drawings, the same or similar reference symbols refer to the same or similar elements.

DETAILED DESCRIPTION OF EMBODIMENTS

Figure 1:
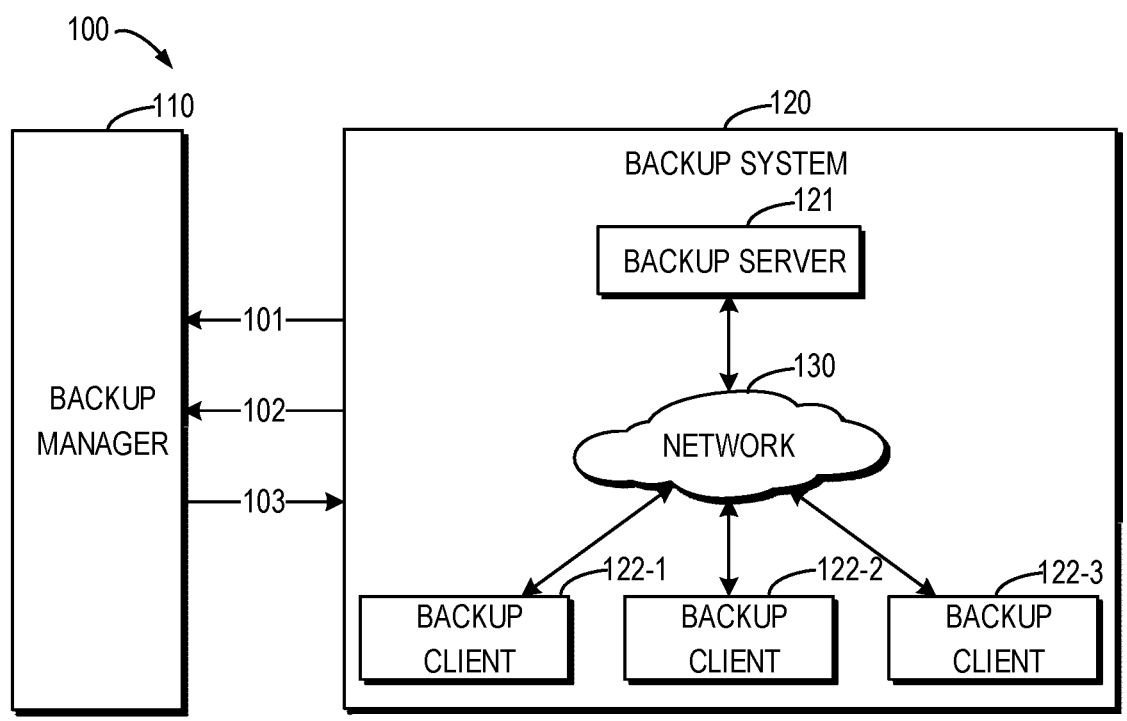
FIG. 1 illustrates a schematic diagram of an example environment in which embodiments of the present disclosure can be implemented.

Preferred embodiments of the present disclosure will be described as follows in greater detail with reference to the drawings. Although preferred embodiments of the present disclosure are illustrated in the drawings, it is to be understood that the present disclosure described herein may be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "an example implementation" are to be read as "at least one example implementation." The term "another implementation" is to be read as "at least one other implementation." Terms "a first", "a second" and others may denote different or identical objects. The following text may also contain other explicit or implicit definitions.

As described above, in order to ensure that data at the backup client is not lost, the data at the backup client needs to be backed up to the storage server periodically. However, there are a lot of backup clients in a large-scale backup system. If data backups for each backup client are scheduled independently, it will be very difficult to manage backup time slots for all of the backup clients. Therefore, the backup schedules for all of the backup clients need to be managed collectively to achieve the optimal system performance.

In traditional solutions, it is typical that a system administrator manually configures a backup schedule of each backup client through a backup management tool of the backup server. However, the solution often has the following restrictions: 1) an unreasonable backup schedule may cause some backups to fail or have low performance, thereby affecting data protection; 2) the backup system often has many factors affecting backup tasks, and the management of the backup schedule therefore costs a lot of human resources and efforts; 3) in many cases, the backup schedule may need to be re-defined (for example, due to route changing of the network, registration of a new backup client, and hardware upgrades of the backup server), resulting in introduction of a lot of duplicated jobs.

Embodiments of the present disclosure provide a solution for managing a backup system. In the solution, a state of the backup system is obtained. The backup system comprises a backup server and at least one backup client, where the backup server is communicatively coupled to the at least one backup client via a network and configured to back up data of the at least one backup client. A reward score corresponding to the state of the backup system is determined. In addition, configuration information for the backup system is determined based on the state of the backup system and the reward score by using a neural network. The configuration information indicates a schedule for the backup server to perform data backups on the at least one backup client. In this way, embodiments of the present disclosure can adjust, based on the state of the backup system, a backup schedule thereof in real time, thereby improving the performance of the backup system and reducing the management overhead of the backup system.

Hereinafter, reference will be made to the drawings to further describe embodiments of the present disclosure. FIG. 1 illustrates a block diagram of an example environment 100 in which embodiments of the present disclosure can be implemented. It is to be understood that the structure of the environment 100 is described merely as an example, without suggesting any limitation to the scope of the present disclosure.

As shown in FIG. 1, the environment 100 may include a backup manager 110 and a backup system 120. The backup manager 110, for example, may be implemented using any physical host, server, virtual machine, and the like. The backup system 120 may include a backup server 121 and a plurality of backup clients 122-1, 122-2 and 122-3 (collectively referred to as "backup clients 122" or individually referred to as "backup client 122"). The backup server 121 communicates with the backup clients 122 via a network 130, and is configured to back up data at one or more of the backup clients 122. The backup server 121 and/or backup client 122, for example, may be implemented using any physical host, server, virtual machine, and the like.

In some embodiments, the backup manager 110 may obtain a state 101 of the backup system 120. The state 101, for example, may include a state (also referred to as "server state") of the backup server 121, respective states (also referred to as "client states") of the plurality of backup clients 122 and a network state. In some embodiments, the state of the backup server 121, for example, may include at least one of the following: storage usage at the backup server 121, CPU usage at the backup server 121 (for example, during a data backup performed against one or more backup clients 122), memory usage at the backup server 121 (for example, during a data backup performed against one or more backup clients 122), and input/output (I/O) operation usage at the backup server 121. In some embodiments, the state of a backup client 122, for example, may include at least one of the following: CPU usage at the backup client 122 (for example, during a data backup), memory usage at the backup client 122 (for example, during a data backup), the number of files at the backup client 122, a size of data at the backup client 122, a duration of a last data backup performed on the backup client 122, a result (for example, success or failure) of the last data backup performed on the backup client 122, and the like. In some embodiments, the network state may include round-trip delay of the network and/or a network bandwidth for data backup, etc.

In some embodiments, the backup manager 110 may determine a reward score 102 for the state 101 of the backup system 120. The reward score 102, for example, may be a reward of the last backup action performed against the backup system 120, which may be obtained based on the state 101 of the backup system 120. In some embodiments, for example, the backup server 121 may include a plurality of backup tasks for performing data backups on the plurality of backup clients 122, where each backup task may correspond to one backup client 122, and each backup client 122 may correspond to one or more backup tasks (for example, different backup tasks may be created for different types of data or different disks at each backup client 122). In some embodiments, the state 101 of the backup system 120 may include respective durations and results of last executions of the plurality of backup tasks. In some embodiments, the backup manager 110 may determine the reward score 102 based on the durations and results of the last executions of the plurality of backup tasks, as shown by the formula (1) below:

$$R = \sum_{n=1}^{N} \left( \frac{P_n}{\log T_n} - (1 - P_n) \right) \quad (1)$$

where N represents the number of backup tasks; $T_n$ represents a duration of the last execution of the $n^{th}$ backup task; and $P_n$ represents a result of the last execution of the $n^{th}$ backup task, where 1 represents success while 0 represents failure, for example. As can be seen from the formula (1), if a backup task in the backup system succeeds with less time, a higher reward score can be obtained. The reward score 102 can be used to evaluate whether the current state 101 of the backup system 120 is good or bad. Alternatively, in some other embodiments, the reward score 102 can also be determined based on other information indicated by the state 101 of the backup system 120.

In some embodiments, the backup manager 110 may determine, based on the state 101 of the backup system 120 and the reward score 102, configuration information 103 for the backup system 120. The configuration information 103 corresponds to a backup action to be performed by the backup system 120. For example, the configuration information 103 indicates a schedule for the backup server 121 to perform data backups on the plurality of backup clients 122. In the following, "configuration information" for a backup system may also be referred to as a "backup action." In some embodiments, the configuration information 103 may be represented by a 1×N array, where N represents the number of backup clients and each element in the array indicates an execution time of a corresponding backup task. It would be appreciated that N will be dynamically changed with the number of backup clients and/or backup tasks. In some embodiments, the backup manager 110 may configure the configuration information 103 to the backup server 121. The backup server 121 may perform, based on the configuration information 103, data backups on one or more of the plurality of backup clients 122 at specified times.

In some embodiments, the backup manager 110 may determine, based on the state 101 of the backup system 120 and the reward score 102 and by using a neural network, the backup action 103 to be performed by the backup system 120. The neural network, for example, may be designed based on a Deep Deterministic Policy Gradient (DDPG) algorithm for implementing continuous control. The DDPG algorithm is designed based on a Deep Q Network (DQN), and can improve stability and convergence of the Actor-Critic network, making it more suitable for handling the management of a backup system.

Figure 2:
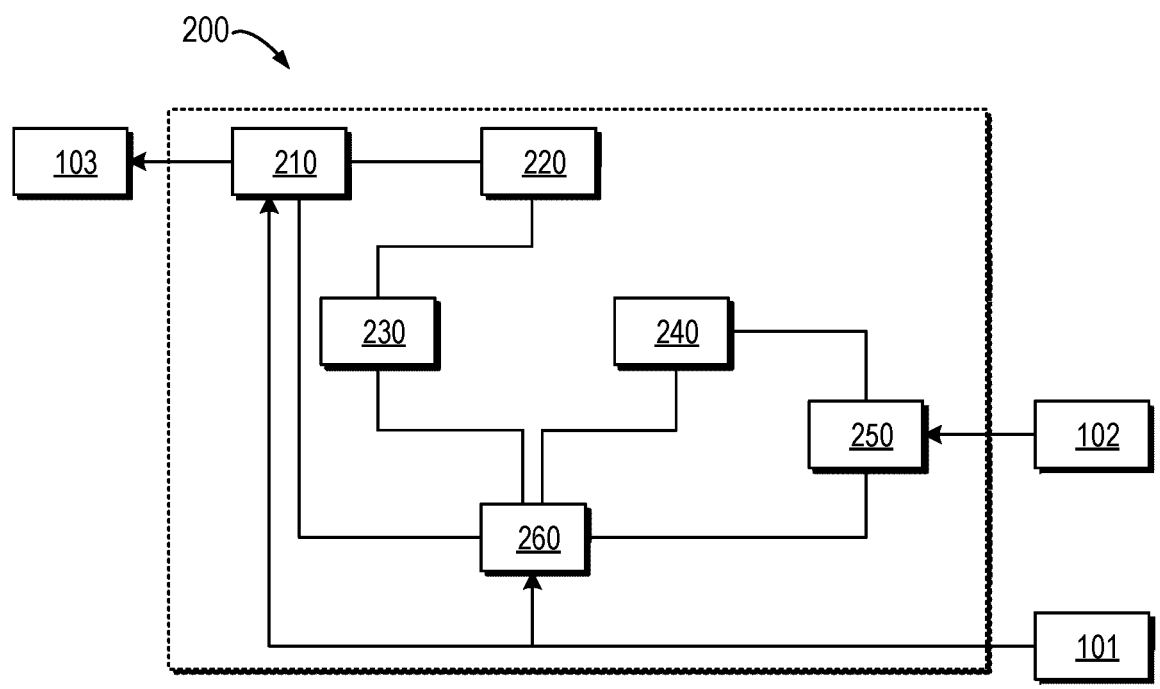
FIG. 2 illustrates a schematic block diagram of a neural network for managing a backup system according to embodiments of the present disclosure.

FIG. 2 illustrates a schematic block diagram of a neural network 200 for managing a backup system according to embodiments of the present disclosure. The neural network 200, for example, may be implemented at the backup manager 110 as shown in FIG. 1.

As shown in FIG. 2, the neural network 200 may generally include an actor network 210 and a critic network 260, both of which may receive the state 101 of the backup system 120. The actor network 210 and the critic network 260 may be coupled to each other. The neural network 200 may further include an action gradient module 220 and a policy gradient module 230, both of which are configured to update, based on an output of the critic network 260, a network parameter of the actor network 210. Hereinafter, the action gradient module 210 and the policy gradient module 230 may be collectively referred to as a "first sub-network" for updating the network parameter of the actor network 210. The neural network 200 may further include a Time Difference (TD) error module 240 and a target Q network 250, both of which are configured to update, based on an output of the critic network 260 and the reward score 102 corresponding to the state 101, a network parameter of the critic network 260. Hereinafter, the TD error module 240 and the target Q network 250 may be collectively referred to as a "second sub-network" for updating the network parameter of the critic network 260.

Figure 3A:
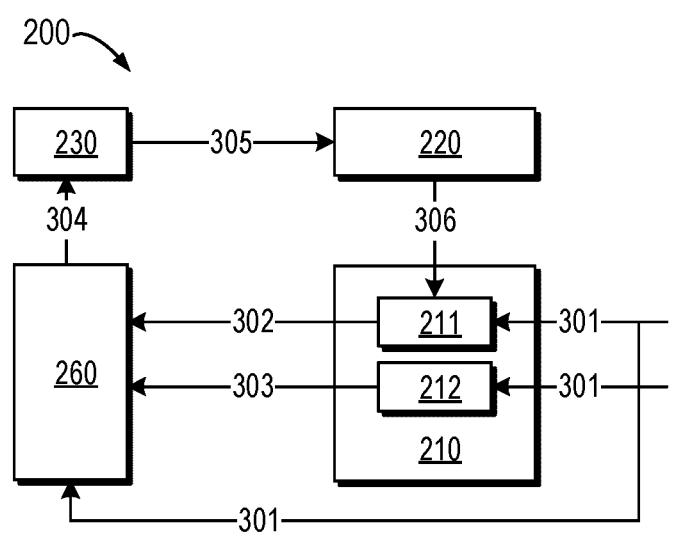
FIG. 3A illustrates a schematic diagram for training an actor network according to embodiments of the present disclosure.

FIG. 3A illustrates a schematic diagram for training the actor network 210 according to embodiments of the present disclosure. As shown in FIG. 3A, the actor network 210 may include an actor evaluation network 211 and an actor target network 212, where a network parameter of the actor evaluation network 211 (also referred to as a "first network parameter") may be updated with training of the actor network 210, and a network parameter of the actor target network 212 may usually be determined based on an empirical value and may be constant.

The actor evaluation network 211 and the actor target network 212 may receive a state 301 (for example, which can be the state 101 as shown in FIG. 1) of the backup system 120 at a current time. The actor evaluation network 211 may determine, based on the state 301 obtained at the current time and the first network parameter, a backup action 302 at the current time. The actor target network 212 may determine, based on the state 301 obtained at the current time, a target backup action 303 at the current time. The backup action 302 and the target backup action 303 may be provided to the critic network 260. The critic network 260 may generate, based on the backup action 302, the target backup action 303 and the state 301 of the backup system 120 at the current time, an evaluation 304 of the backup action 302, and provide the evaluation 304 to the action gradient module 230. The action gradient module 230 may determine an action gradient 305 of the evaluation 304 relative to the backup action 302, and provide the action gradient 305 to the policy gradient module 220. The policy gradient module 220 may determine a policy gradient 306 of the first network parameter relative to the backup action 302, where the action gradient 305 decides a rising speed of the policy gradient. The policy gradient 306 may be used to update the network parameter (that is, the first network parameter) of the actor evaluation network 211, such that the actor evaluation network 211 can determine a backup action at a next time, based on a state of the backup system 120 obtained at the next time (for example, after the backup action 302 is applied to the backup system 120) and the updated first network parameter. During the training of the actor network 210, the policy gradient module 220 and the network parameter of the actor evaluation network 211 may be updated.

Figure 3B:
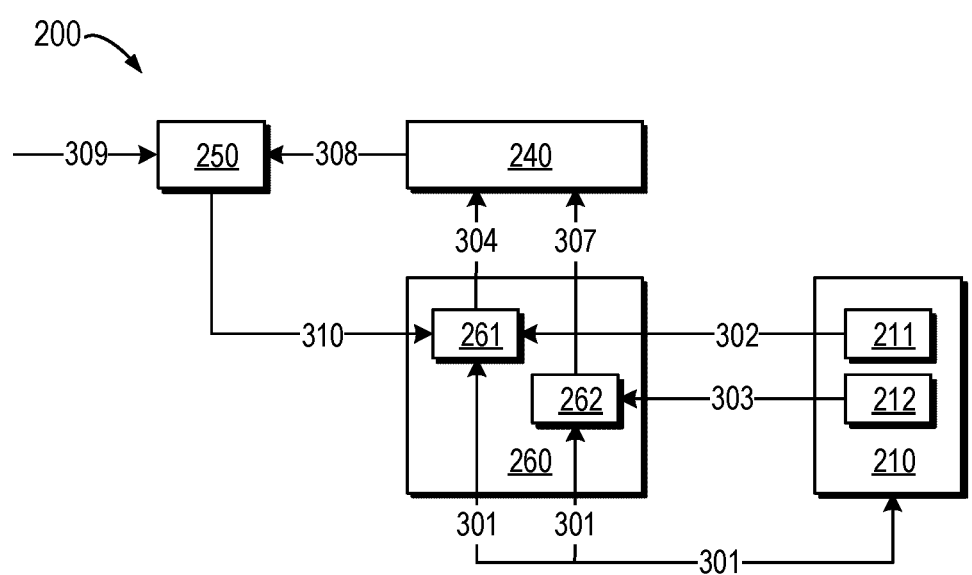
FIG. 3B illustrates a schematic diagram for training a critic network according to embodiments of the present disclosure.

FIG. 3B illustrates a schematic diagram for training the critic network 260 according to embodiments of the present disclosure. As shown in FIG. 3B, the critic network 260 may include a critic evaluation network 261 and a critic target network 262, where a network parameter (also referred to as a "second network parameter") of the critic evaluation network 261 may be updated with training of the critic network 260, and a network parameter of the critic target network 262 may usually be typically determined based on an empirical value and may be constant.

The critic evaluation network 261 may receive the backup action 302 at the current time provided by the actor evaluation network 211, and determine the evaluation 304 of the backup action 302 based on the state 301 of the backup system 120 at the current time and the second network parameter. The critic target network 262 may receive a target backup action 303 at the current time provided by the actor target network 212, and determine a target evaluation 307 of the target backup action 303 based on the state 301 of the backup system 120 at the current time. The evaluation 304 and the target evaluation 307 may be provided to the TD error module 240. The TD error module 240 may determine an error 308 between the evaluation 304 and the target evaluation 307, and provide the error 308 to the target Q network 250. The target Q network 250 may generate an output 310 based on a reward score 309 (for example, which can be the reward score 102 as shown in FIG. 1) corresponding to the state 301 and the error 308, to update the network parameter (i.e., the second network parameter) of the critic evaluation network 216, such that the critic evaluation network 216 can determine, based on a state of the backup system 120 obtained at a next time (for example, after the backup action 302 is applied to the backup system 120) and the updated second network parameter, an evaluation of a backup action at the next time provided by the actor evaluation network 211. During the training of the critic network 260, the network parameters of the TD error module 240, the target Q network 250 and the critic evaluation network 216 may be updated.

In this way, by training the actor network 210 and the critic network 216, the neural network 200 as shown in FIG. 2 can automatically adjust, based on the obtained state of the backup system 120, configuration information (i.e., a backup action) for the backup system 120 in real time, thereby improving the performance of the backup system 120. Since many manual operations for managing a backup system are replaced by artificial intelligence, the management overhead of the backup system 120 can be reduced significantly.

Figure 4:
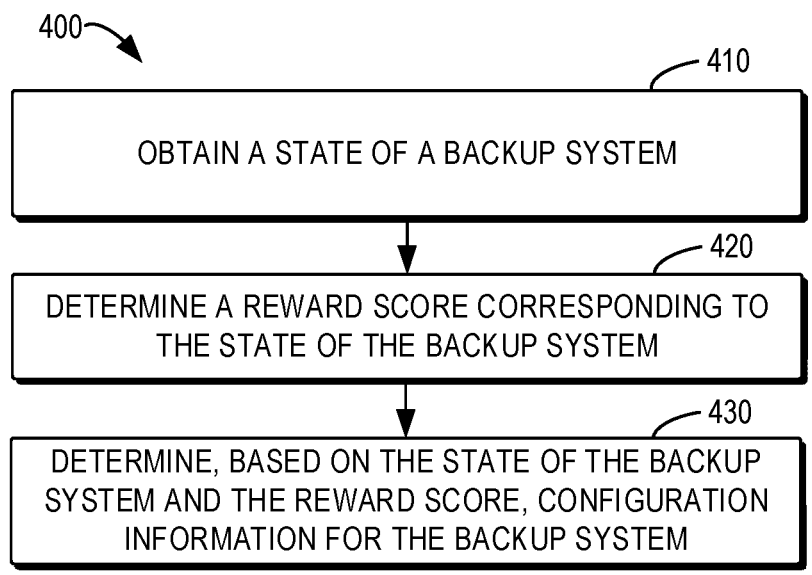
FIG. 4 illustrates a flowchart of an example method for managing a backup system according to embodiments of the present disclosure.

FIG. 4 illustrates a flowchart of an example method 400 of managing a backup system according to embodiments of the present disclosure. For example, the method 400 may be performed by the backup manager 110 as shown in FIG. 1. The method 400 will be described below with reference to FIG. 1. It is to be understood that the method 400 may include an additional action not shown and/or may omit some action shown, and the scope of the present disclosure is not limited in this aspect.

At block 410, the backup manager 110 obtains a state of a backup system, the backup system comprising a backup server and at least one backup client, the backup server being communicatively coupled to the at least one backup client via a network and configured to back up data of the at least one backup client.

In some embodiments, the state of the backup system comprises at least one of the following: a server state of the backup server; respective client states of the at least one backup client; and a network state of the network.

In some embodiments, the server state comprises at least one of the following: storage usage at the backup server; CPU usage at the backup server; memory usage at the backup server; and input/output operation usage at the backup server.

In some embodiments, a client state of a backup client from the at least one backup client comprises at least one of the following: CPU usage at the backup client; memory usage at the backup client; input/output operation usage at the backup client; the number of files at the backup client; the number of files at the backup client; a duration of a last data backup performed on the backup client; and a result of the last data backup performed on the backup client.

In some embodiments, the network state comprises at least one of the following: round-trip delay of the network; and an available network bandwidth of the network.

At block 420, the backup manager 110 determines a reward score corresponding to the state of the backup system.

In some embodiments, the backup server comprises a plurality of backup tasks for performing data backups on the at least one backup client, and the state of the backup system indicates a duration and result of a last execution of a given backup task of the plurality of backup tasks. In some embodiments, determining the reward score comprises: determining the reward score based on the duration and result of the last execution of the given backup task.

At block 430, the backup manager 110 determines, based on the state of the backup system and the reward score, configuration information for the backup system, the configuration information indicating a schedule for the backup server to perform data backups on the at least one backup client.

In some embodiments, determining the configuration information comprises: determining, based on the state of the backup system and the reward score, the configuration information using a neural network.

In some embodiments, the neural network comprises an actor network and a critic network, the actor network comprises an actor evaluation network and an actor target network, the critic network comprises a critic evaluation network and a critic target network, and the neural network further comprises a first sub-network for updating a first network parameter of the actor evaluation network and a second sub-network for updating a second network parameter of the critic evaluation network.

In some embodiments, the actor evaluation network is configured to determine, based on the state of the backup system obtained at a current time and the first network parameter of the actor evaluation network, the configuration information for the backup system at the current time, the configuration information being provided to the critic evaluation network.

In some embodiments, the actor target network is configured to determine, based on the state of the backup system obtained at the current time, target configuration information for the backup system at the current time, the target configuration information being provided to the critic target network.

In some embodiments, the critic evaluation network is configured to determine, based on the state of the backup system obtained at the current time and the second network parameter of the critic evaluation network, an evaluation of the configuration information, the evaluation being provided to the first sub-network and the second sub-network.

In some embodiments, the critic target network is configured to determine, based on the state of the backup system obtained at the current time, a target evaluation of the target configuration information, the target evaluation being provided to the second sub-network.

In some embodiments, the first sub-network is configured to update the first network parameter based on the evaluation.

In some embodiments, the second sub-network is configured to update the second network parameter based on the reward score and a difference between the evaluation and the target evaluation.

Figure 5:
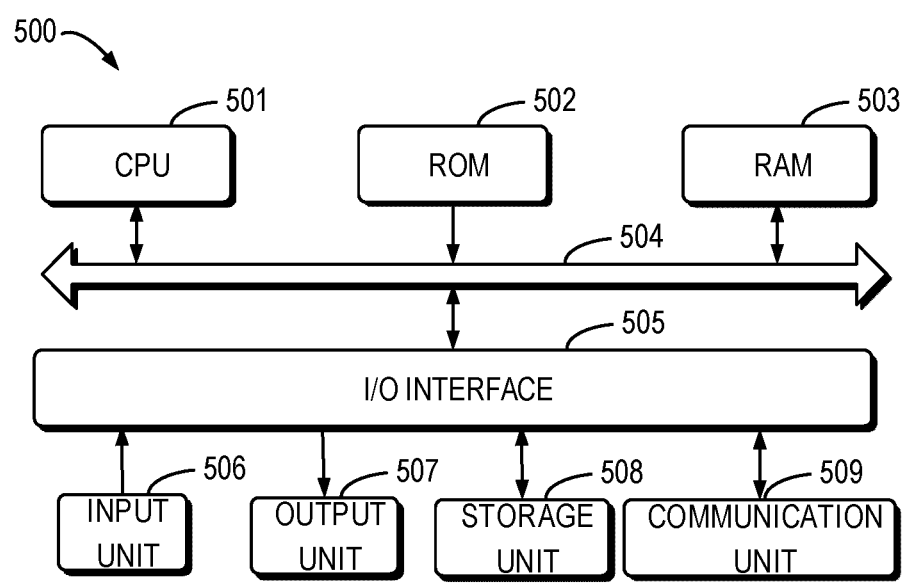
FIG. 5 illustrates a schematic block diagram of an example device that can be used to implement embodiments of the present disclosure.

FIG. 5 illustrates a block diagram of an example device 500 adapted to implement embodiments of the present disclosure. For example, the backup manager 110 as shown in FIG. 1 may be implemented by the device 500. As shown, the device 500 includes a central processing unit (CPU) 501, which can execute various suitable actions and processing based on the computer program instructions stored in the read-only memory (ROM) 502 or computer program instructions loaded in the random-access memory (RAM) 503 from a storage unit 508. The RAM 503 can also store all kinds of programs and data required by the operations of the device 500. CPU 501, ROM 502 and RAM 503 are connected to each other via a bus 504. The input/output (I/O) interface 505 is also connected to the bus 504.

A plurality of components in the device 500 is connected to the I/O interface 505, including: an input unit 506, such as keyboard, mouse and the like; an output unit 507, e.g., various kinds of display and loudspeakers etc.; a storage unit 508, such as magnetic disk and optical disk etc.; and a communication unit 509, such as network card, modem, wireless transceiver and the like. The communication unit 509 allows the device 500 to exchange information/data with other devices via the computer network, such as Internet, and/or various telecommunication networks.

The above described procedure and processing, such as the method 400, can also be executed by the processing unit 501. For example, in some embodiments, the method 400 can be implemented as a computer software program tangibly included in the machine-readable medium, e.g., storage unit 508. In some embodiments, the computer program can be partially or fully loaded and/or mounted to the device 500 via ROM 502 and/or communication unit 509. When the computer program is loaded to RAM 503 and executed by the CPU 501, one or more steps of the method 400 as described above can be implemented.

The present disclosure can be a method, apparatus, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transitory signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instructions can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combination of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where a remote computer is involved, the remote computer can be connected to the user computer via any type of network, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to embodiments of the present disclosure. It should be understood that each block of the flow chart and/or block diagram and the combination of various blocks in the flow chart and/or block diagram can be implemented by computer-readable program instructions.

The computer-readable program instructions can be provided to the processing unit of a general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into a computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusively for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each embodiment, or enable others of ordinary skill in the art to understand implementations of the present disclosure.

We claim:

1. A method of managing a backup system, comprising:
   obtaining a state of a backup system, the backup system comprising a backup server and at least one backup client, the backup server being communicatively coupled to the at least one backup client via a network and configured to back up data of the at least one backup client;
   determining a reward score corresponding to the state of the backup system, wherein the backup server comprises a plurality of backup tasks for performing data backups on the at least one backup client, and the state of the backup system indicates a duration and result of a last execution of a given backup task of the plurality of backup tasks, and determining the reward score comprises: determining the reward score based on the duration and result of the last execution of the given backup task, wherein the reward score is inversely proportional to a completion time of the given backup task in the backup system;
   determining, based on the state of the backup system and the reward score, configuration information for the backup system; and
   reconfiguring, based on the configuration information for the backup system, a backup schedule for the backup server to perform data backups on the at least one backup client in real time.

2. The method of claim 1, wherein the state of the backup system comprises at least one of the following:
   a server state of the backup server;
   respective client states of the at least one backup client; and
   a network state of the network.

3. The method of claim 2, wherein the server state comprises at least one of the following:
   storage usage at the backup server;
   CPU usage at the backup server;
   memory usage at the backup server; and
   input/output operation usage at the backup server.

4. The method of claim 2, wherein a client state of a backup client from the at least one backup client comprises at least one of the following:
   CPU usage at the backup client;
   memory usage at the backup client;
   input/output operation usage at the backup client;
   the number of files at the backup client;
   a size of data at the backup client;
   a duration of a last data backup performed on the backup client; and
   a result of the last data backup performed on the backup client.

5. The method of claim 2, wherein the network state comprises at least one of the following:
   round-trip delay of the network; and
   an available network bandwidth of the network.

6. The method of claim 1, wherein determining the configuration information comprises:
   determining, based on the state of the backup system and the reward score, the configuration information using a neural network.

7. The method of claim 6, wherein the neural network comprises an actor network and a critic network, the actor network comprises an actor evaluation network and an actor target network, the critic network comprises a critic evaluation network and a critic target network, and the neural network further comprises a first sub-network for updating a first network parameter of the actor evaluation network and a second sub-network for updating a second network parameter of the critic evaluation network, and wherein:
   the actor evaluation network is configured to determine, based on the state of the backup system obtained at a current time and the first network parameter of the actor evaluation network, the configuration information for the backup system at the current time, the configuration information being provided to the critic evaluation network;
   the actor target network is configured to determine, based on the state of the backup system obtained at the current time, target configuration information for the backup system at the current time, the target configuration information being provided to the critic target network;
   the critic evaluation network is configured to determine, based on the state of the backup system obtained at the current time and the second network parameter of the critic evaluation network, an evaluation of the configuration information, the evaluation being provided to the first sub-network and the second sub-network;
   the critic target network is configured to determine, based on the state of the backup system obtained at the current time, a target evaluation of the target configuration information, the target evaluation being provided to the second sub-network;
   the first sub-network is configured to update the first network parameter based on the evaluation; and
   the second sub-network is configured to update the second network parameter based on the reward score and a difference between the evaluation and the target evaluation.

8. The method of claim 6, wherein the neural network is based on a Deep Deterministic Policy Gradient (DDPG) algorithm for implementing a continuous control, the DDPG algorithm being designed based on a Deep Q Network (DQN).

9. The method of claim 1, wherein the configuration information is represented by a 1×N array, N representing a number of backup clients including the at least one backup client, each element in the 1×N array indicating an execution time of a corresponding backup task.

10. An electronic device comprising:
    at least one processing unit;
    at least one memory coupled to the at least one processing unit and storing instructions for execution by the at least one processing unit, the instructions, when executed by the at least one processing unit, causing the device to perform acts comprising:

obtaining a state of a backup system, the backup system comprising a backup server and at least one backup client, the backup server being communicatively coupled to the at least one backup client via a network and configured to back up data of the at least one backup client;

determining a reward score corresponding to the state of the backup system, wherein the backup server comprises a plurality of backup tasks for performing data backups on the at least one backup client, and the state of the backup system indicates a duration and result of a last execution of a given backup task of the plurality of backup tasks, and determining the reward score comprises: determining the reward score based on the duration and result of the last execution of the given backup task, wherein the reward score is inversely proportional to a completion time of the given backup task in the backup system;

determining, based on the state of the backup system and the reward score, configuration information for the backup system; and reconfiguring, based on the configuration information for the backup system, a backup schedule for the backup server to perform data backups on the at least one backup client in real time.

11. The device of claim 10, wherein the state of the backup system comprises at least one of the following:
a server state of the backup server;
respective client states of the at least one backup client; and
a network state of the network.

12. The device of claim 11, wherein the server state comprises at least one of the following:
storage usage at the backup server;
CPU usage at the backup server;
memory usage at the backup server; and
input/output operation usage at the backup server.

13. The device of claim 11, wherein a client state of a backup client from the at least one backup client comprises at least one of the following:
CPU usage at the backup client;
memory usage at the backup client;
input/output operation usage at the backup client;
the number of files at the backup client;
a size of data at the backup client;
a duration of a last data backup performed on the backup client; and
a result of the last data backup performed on the backup client.

14. The device of claim 11, wherein the network state comprises at least one of the following:
round-trip delay of the network; and
an available network bandwidth of the network.

15. The device of claim 10, wherein determining the configuration information comprises:
determining, based on the state of the backup system and the reward score, the configuration information using a neural network.

16. The device of claim 15, wherein the neural network comprises an actor network and a critic network, the actor network comprises an actor evaluation network and an actor target network, the critic network comprises a critic evaluation network and a critic target network, and the neural network further comprises a first sub-network for updating a first network parameter of the actor evaluation network and a second sub-network for updating a second network parameter of the critic evaluation network, and wherein:

the actor evaluation network is configured to determine, based on the state of the backup system obtained at a current time and the first network parameter of the actor evaluation network, the configuration information for the backup system at the current time, the configuration information being provided to the critic evaluation network;

the actor target network is configured to determine, based on the state of the backup system obtained at the current time, target configuration information for the backup system at the current time, the target configuration information being provided to the critic target network;

the critic evaluation network is configured to determine, based on the state of the backup system obtained at the current time and the second network parameter of the critic evaluation network, an evaluation of the configuration information, the evaluation being provided to the first sub-network and the second sub-network;

the critic target network is configured to determine, based on the state of the backup system obtained at the current time, a target evaluation of the target configuration information, the target evaluation being provided to the second sub-network;

the first sub-network is configured to update the first network parameter based on the evaluation; and the second sub-network is configured to update the second network parameter based on the reward score and a difference between the evaluation and the target evaluation.

17. A computer program product tangibly stored on a non-transitory computer storage medium and including machine-executable instructions which cause, when executed by a device, the device to perform operations, the operations comprising:

obtaining a state of a backup system, the backup system comprising a backup server and at least one backup client, the backup server being communicatively coupled to the at least one backup client via a network and configured to back up data of the at least one backup client;

determining a reward score corresponding to the state of the backup system, wherein the backup server comprises a plurality of backup tasks for performing data backups on the at least one backup client, and the state of the backup system indicates a duration and result of a last execution of a given backup task of the plurality of backup tasks, and determining the reward score comprises: determining the reward score based on the duration and result of the last execution of the given backup task, wherein the reward score is inversely proportional to a completion time of the given backup task in the backup system;

determining, based on the state of the backup system and the reward score, configuration information for the backup system; and reconfiguring, based on the configuration information for the backup system, a backup schedule for the backup server to perform data backups on the at least one backup client in real time.

18. The computer program product of claim 17, wherein the state of the backup system comprises at least one of the following:
a server state of the backup server;
respective client states of the at least one backup client; and
a network state of the network.

19. The computer program product of claim 18, wherein the server state comprises at least one of the following:
- storage usage at the backup server;
- CPU usage at the backup server;
- memory usage at the backup server; and
- input/output operation usage at the backup server.

20. The computer program product of claim 18, wherein a client state of a backup client from the at least one backup client comprises at least one of the following:
- CPU usage at the backup client;
- memory usage at the backup client;
- input/output operation usage at the backup client;
- the number of files at the backup client;
- a size of data at the backup client;
- a duration of a last data backup performed on the backup client; and
- a result of the last data backup performed on the backup client.

\* \* \* \* \*